No. 886,711. PATENTED MAY 5, 1908.
J. E. LUCAS.
RAKE CLEANER.
APPLICATION FILED FEB. 26, 1908.
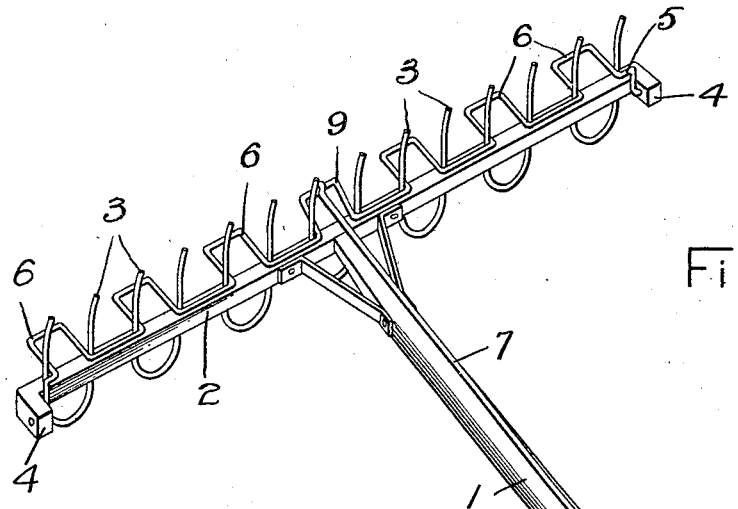
Fig.1.
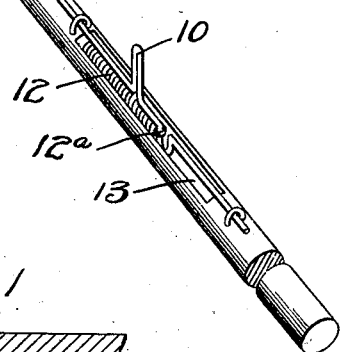
Fig.2.
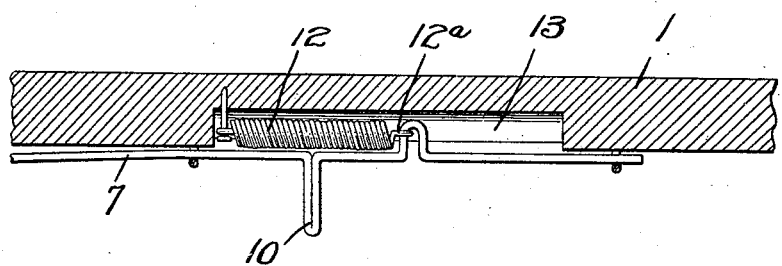
Witnesses
Inventor
J. E. Lucas.
By D. Swift &c.
Attorneys

UNITED STATES PATENT OFFICE.

JAMES EDWARD LUCAS, OF BROADLAND, ILLINOIS, ASSIGNOR OF ONE-HALF TO HARLEY BEAMAN, OF SIDELL, ILLINOIS.

RAKE-CLEANER.

No. 886,711.        Specification of Letters Patent.        Patented May 5, 1908.

Application filed February 26, 1908. Serial No. 417,971.

*To all whom it may concern:*

Be it known that I, JAMES EDWARD LUCAS, a citizen of the United States, residing at Broadland, in the county of Champaign and State of Illinois, have invented a new and useful Rake-Cleaner; and I do hereby declare the following to be a full, clear, and exact description of the invention, such as will enable others skilled in the art to which it appertains to make and use the same.

The invention relates to improvements in rakes, and has for its object to provide a cleaner attachment whereby hay and leaves and other foreign matter may be readily removed from the rake.

With these and other objects in view the invention consists in the novel construction and arrangement of parts hereinafter described and shown and particularly pointed out in the appended claims.

In the drawings, Figure 1 is a perspective view of my invention shown inverted. Fig. 2 is a longitudinal sectional view taken through a portion of the handle.

Referring to the drawings 1 designates the handle of the rake having a head 2 and teeth 3. The head is provided with inwardly bent portions 4 which provide bearings for the rock shaft 5, which is pivotally mounted therein. The rock shaft 5 is provided with a plurality of tooth cleaners 6 arranged between the teeth of the rake.

Mounted upon the under side of the handle 1 is a rod 7 which is connected with the crank portion 9 of the rock shaft 5. The handle 1 is also provided with a groove 13 in which is mounted a spring 12, which is connected with the rod 7 as at $12^a$ which forces the rod forward, thus holding the cleaner in its normal position. The rod 7 is provided with a loop or projection 10 which the operator pulls rearwardly when it is desired to actuate the cleaner as will be readily understood.

What is claimed is,

1. A rake having a head, said head having inward projections, a rock shaft pivotally mounted in said projections, said rock shaft being provided with rake cleaners, a rod connected with said rock shaft for actuating the same, a handle connected with said head, a groove formed in said handle a spring mounted in said groove and connected with said rod for holding the same in a forward position.

2. A rake cleaner, comprising a rake head, having inward projections, a rock shaft pivotally mounted in said projections said rock shaft being provided with rake cleaners, and a rod for actuating said rake cleaner.

3. A rake head, having a rake cleaner, a handle connected with said head, a groove formed in said handle and having a spring mounted therein, an oscillating rod connected with said cleaner and said spring, said rod having a projection for operating the same.

In testimony whereof I have signed my name to this specification in the presence of two subscribing witnesses.

JAMES EDWARD LUCAS.

Witnesses:
    S. V. CAMERER,
    W. A. CADWALLADER.